(12) United States Patent
Dwyer et al.

(10) Patent No.: US 8,078,344 B2
(45) Date of Patent: Dec. 13, 2011

(54) SYSTEM AND METHOD FOR DISPLAYING THE PROTECTED AIRSPACE ASSOCIATED WITH A CIRCLE-TO-LAND MANEUVER

(75) Inventors: David B. Dwyer, Scottsdale, AZ (US); Aaron J. Gannon, Anthem, AZ (US)

(73) Assignee: Honeywell International Inc., Morristown, NJ (US)

( * ) Notice: Subject to any disclaimer, the term of this patent is extended or adjusted under 35 U.S.C. 154(b) by 671 days.

(21) Appl. No.: 11/112,796

(22) Filed: Apr. 21, 2005

(65) Prior Publication Data

US 2006/0241820 A1 Oct. 26, 2006

(51) Int. Cl.
*G06F 19/00* (2011.01)
*G08G 5/00* (2006.01)
*G01C 23/00* (2006.01)

(52) U.S. Cl. ......... 701/16; 701/1; 701/3; 701/4; 701/13; 701/14; 701/15; 340/947; 340/948; 340/951; 340/971; 340/972; 340/973; 73/178 T (58) Field of Classification Search .................. 340/971, 340/972, 973, 947, 948, 951; 701/13, 14, 701/16, 3, 4, 15; 304/951; 73/178 T See application file for complete search history.

(56) References Cited

U.S. PATENT DOCUMENTS

| | | | | |
|---|---|---|---|---|
| 4,999,782 A * | 3/1991 | BeVan | ........................... | 701/206 |
| 5,432,895 A * | 7/1995 | Myers | ........................... | 345/419 |
| 5,646,854 A * | 7/1997 | Bevan | ........................... | 701/206 |
| 5,657,009 A * | 8/1997 | Gordon | ........................... | 340/968 |
| 6,112,141 A * | 8/2000 | Briffe et al. | ........................... | 701/14 |
| 6,161,063 A * | 12/2000 | Deker | ........................... | 701/4 |
| 6,199,008 B1 * | 3/2001 | Aratow et al. | ........................... | 701/120 |
| 6,389,355 B1 * | 5/2002 | Gibbs et al. | ........................... | 701/206 |
| 6,438,469 B1 * | 8/2002 | Dwyer et al. | ........................... | 701/16 |
| 6,496,760 B1 * | 12/2002 | Michaelson et al. | ........................... | 701/3 |
| 6,522,958 B1 * | 2/2003 | Dwyer et al. | ........................... | 701/3 |
| 6,552,669 B2 * | 4/2003 | Simon et al. | ........................... | 340/945 |
| 6,606,563 B2 * | 8/2003 | Corcoran, III | ........................... | 701/301 |
| 6,653,947 B2 * | 11/2003 | Dwyer et al. | ........................... | 340/970 |
| 6,675,095 B1 * | 1/2004 | Bird et al. | ........................... | 701/301 |
| 6,703,945 B2 * | 3/2004 | Kuntman et al. | ........................... | 340/961 |
| 6,922,631 B1 * | 7/2005 | Dwyer et al. | ........................... | 701/206 |
| 2002/0089432 A1 | 7/2002 | Staggs et al. | | |
| 2002/0116097 A1 * | 8/2002 | Block et al. | ........................... | 701/9 |
| 2004/0093131 A1 * | 5/2004 | Block et al. | ........................... | 701/9 |

FOREIGN PATENT DOCUMENTS

| | | |
|---|---|---|
| WO | WO 01/57828 A1 | 8/2001 |
| WO | WO 01/90694 A2 | 11/2001 |
| WO | WO 03/098576 A1 | 11/2003 |
| WO | PCT/US2006/014372 | 12/2006 |

OTHER PUBLICATIONS

Dick McKinney, Circling Traps, Safety: Approach & Landing, Business & Commercial Aviation, Sep. 2002.
PCT Search Report.

* cited by examiner

*Primary Examiner* — John Nguyen
*Assistant Examiner* — Chuong Nguyen
(74) *Attorney, Agent, or Firm* — Ingrassia Fisher & Lorenz, P.C.

(57) ABSTRACT

A display system and method for an aircraft displays, in real-time, the protected airspace associated with a CTL maneuver. The system processes aircraft approach category data and determines the protected airspace based at least in part on the processed aircraft approach category. An image representative of the determined protected airspace is displayed on the aircraft flight deck display system.

13 Claims, 10 Drawing Sheets

| APPROACH CATEGORY | MAX IAS (KTS) | RADIUS (NM) |
|---|---|---|
| A | 90 | 1.3 |
| B | 120 | 1.5 |
| C | 140 | 1.7 |
| D | 165 | 2.3 |
| E | >165 | 4.5 |

FIG. 10 ly in nature and is not intended to limit the invention or the appli-

SYSTEM AND METHOD FOR DISPLAYING THE PROTECTED AIRSPACE ASSOCIATED WITH A CIRCLE-TO-LAND MANEUVER

TECHNICAL FIELD

The present invention relates to a display for a vehicle and, more particularly, to a system and method for displaying the protected airspace associated with a circle-to-land maneuver in an aircraft display.

BACKGROUND

The preferred method for landing an aircraft is a straight-in approach to the runway. There may be instances, however, when a straight-in approach to a runway is unavailable. In such instances, the aircraft flight crew may need to implement a so-called circle-to-land (CTL) maneuver. There may be any one of numerous reasons for which the flight crew may need to implement a CTL maneuver. For example, inclement weather or traffic around the airport may prohibit a straight in landing. Moreover, at some airports a CTL maneuver may be necessitated by limited air traffic control facilities. In other instances, although an airport may have a straight-in instrument approach procedure for certain runways, local weather conditions or other constraints may favor another runway that does not have such an approach procedure. In these latter instances, the initial approach to the airport may be straight in, but the flight crew ultimately implements a CTL maneuver. In yet other instances navigational aids ("NAVAIDS") may direct the aircraft to the center, rather than to the end, of the runway. In these instances, the flight implements a CTL maneuver to align the aircraft with the appropriate runway.

No matter the reason for its implementation, a CTL maneuver can be challenging because of the high work load experienced by the flight crew during the maneuver. For example, a CTL maneuver is typically performed at low altitude using visual cues, such as runway lights, and is often performed manually. During a CTL maneuver, the flight crew is also responsible to maintain visual contact with the runway. Thus, if the CTL maneuver results in the aircraft circling in a direction that is opposite to the seat in which the pilot-in-control (PIC) is seated, the PIC may need to rely on the co-pilot, or other flight crew member, to keep the runway in view. In view of these responsibilities alone, it will be appreciated that the difficulty of a CTL maneuver can increase significantly in cases of poor weather, at night time, or in other conditions of low visibility.

In addition to each of the responsibilities and factors described above, during a CTL maneuver the pilot is responsible for keeping the aircraft within a defined protected air space. The protected airspace is based, for example, on the aircraft category (e.g., indicated airspeed) used during the CTL maneuver, and is typically defined, for a specific aircraft category, to be a fixed radius from the ends of each runway. However, these data, while provided on most approach charts, is not available to the flight crew in other forms. Thus, an aircraft may fly outside of the protected airspace during a CTL maneuver without the flight crew even being aware of this situation. This can significantly increase the probability of, among other things, a controlled flight into terrain (CFIT) event.

Hence, there is a need for a display system and method that displays, in real-time, the protected airspace associated with a CTL maneuver, to thereby reduce the workload on the flight crew during a CTL maneuver and/or reduce the probability of a CFIT event occurring during a CTL maneuver. The present invention addresses one or more of these needs.

BRIEF SUMMARY

The present invention provides a display system and method that displays, in real-time, the protected airspace associated with a CTL maneuver.

In one embodiment, and by way of example only, a flight deck display system includes a processor and a display device. The processor is adapted to receive data representative of an aircraft approach category and is operable, in response thereto, to supply one or more protected airspace image rendering display commands. The display device is coupled to receive the protected airspace image rendering display commands and is operable, in response thereto, to render an image representative of a protected airspace associated with the aircraft approach category.

In another exemplary embodiment, a method of displaying protected airspace on an aircraft flight deck display system includes the steps of processing aircraft approach category data and determining a protected airspace based at least in part on the processed aircraft approach category. An image representative of the determined protected airspace is displayed on the aircraft flight deck display system.

BRIEF DESCRIPTION OF THE DRAWINGS

The present invention will hereinafter be described in conjunction with the appended drawing figures, wherein like numerals denote like elements, and in which.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices.

Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

Turning now to the description, and with reference to FIG. 1, an exemplary flight deck display system will be described. The system 100 includes at least a user interface 102, a processor 104, one or more navigation databases 106, a navigation computer 108, and a display device 112. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen, and may use the keyboard 111 to, among other things, input various data.

The processor 104 is in operable communication with the navigation computer 108 and the display device 112 via, for example, a communication bus 114. The processor 104 is coupled to receive various types of data from the navigation computer 108 and may additionally receive navigation data from one or more of the navigation databases 106, and is operable to supply appropriate display commands to the display device 112 that cause the display device 112 to render various images. Though not shown in FIG. 1, it will be appreciated that the processor 104 may additionally be coupled to receive various data from one or more other external systems. For example, the processor 104 may also be in operable communication with a source of weather data, a terrain avoidance and warning system (TAWS), a traffic and collision avoidance system (TCAS), an instrument landing system (ILS), and a runway awareness and advisory system (RAAS), just to name a few. If the processor 104 is in operable communication with one or more of these external systems, it will be appreciated that the processor 104 is additionally configured to supply appropriate display commands to the display device 112 so that the data supplied from these external systems may also be selectively displayed on the display device 112.

The processor 104 may include one or more microprocessors, each of which may be any one of numerous known general-purpose microprocessors or application specific processors that operate in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just one or more programmable processors. For example, digital logic circuits and analog signal processing circuits could also be used.

The navigation databases 106 include various types of navigation-related data. These navigation-related data include various flight plan related data such as, for example, waypoints, distances between waypoints, headings between waypoints, navigational aids, obstructions, special use airspace, political boundaries, communication frequencies, aircraft approach information, protected airspace data, and data related to different airports including, for example, runway-related data. It will be appreciated that, although the navigation databases 106 are, for clarity and convenience, shown as being stored separate from the processor 104, all or portions of these databases 106 could be loaded into the on-board RAM 103, or integrally formed as part of the processor 104, and/or RAM 103, and/or ROM 105. The navigation databases 106, or data forming portions thereof, could also be part of one or more devices or systems that are physically separate from the display system 100.

The navigation computer 108 is in operable communication, via the communication bus 114, with various data sources including, for example, the navigation databases 106. The navigation computer 108 is used, among other things, to allow the pilot 109 to program a flight plan from one destination to another, and to input various other types of flight-related data. The flight plan data may then be supplied, via the communication bus 114, to the processor 104 and, in some embodiments, to a non-illustrated flight director. In the depicted embodiment, the navigation computer 108 is additionally configured to supply, via the communication bus 114, data representative of the current flight path and the aircraft category to the processor 104. In this regard, the navigation computer 108 receives various types of data representative of the current aircraft state such as, for example, aircraft speed, altitude, and heading. The navigation computer 108 supplies the programmed flight plan data, the current flight path data, and, when appropriate, the aircraft category to the processor 104, via the communication bus 114. The processor 104 in turn supplies appropriate display commands to the display device 112 so that the programmed flight plan, or at least portions thereof, and the current flight path may be displayed, either alone or in combination, on the display device 112. The processor 104 also receives data from the navigation databases 106, either directly or indirectly, and in turn supplies appropriate display commands to the display device so that at least a portion of the retrieved data are displayed on the display device 112 along with the flight plan and/or current flight path. It will additionally be appreciated that all or portions of the data mentioned herein may be entered manually by a user, such as the pilot 109.

The display device 112 is used to display various images and data, in both a graphical and a textual format, and to supply visual feedback to the user 109 in response to the user input commands supplied by the user 109 to the user interface 102. It will be appreciated that the display device 112 may be any one of numerous known displays suitable for rendering image and/or text data in a format viewable by the user 109. Non-limiting examples of such displays include various cathode ray tube (CRT) displays, and various flat panel displays such as, various types of LCD (liquid crystal display) and TFT (thin film transistor) displays. The display may additionally be based on a panel mounted display, a HUD projection, or any known technology. In an exemplary embodiment, display device 112 includes a panel display. To provide a more complete description of the method that is implemented by the display system 100, a general description of the display device 112 and its layout will now be provided.

Figure 2:
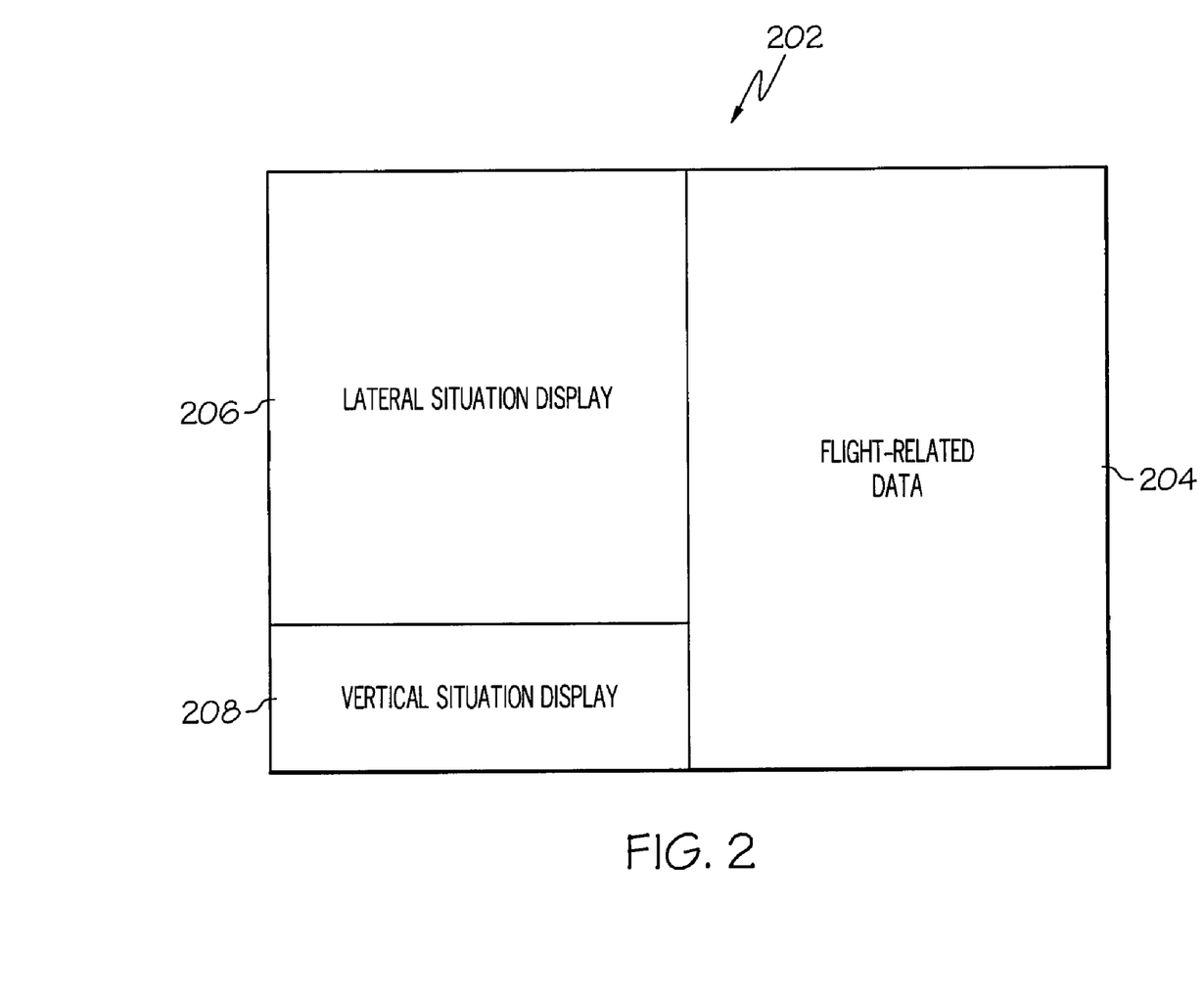
FIG. 2 is a simplified representation of an exemplary display screen that may be used in the system of FIG. 1, which shows the overall layout of the display screen, and on which is various images may be simultaneously displayed.

With reference to FIG. 2, it seen that the display device 112 includes a display area 202 in which multiple graphical and textual images may be simultaneously displayed, preferably in different sections of the display area 202. For example, general flight-related data 204, a lateral situation display 206, and a vertical situation display 208 may be displayed simultaneously, alone, or in various combinations, in various sections of the display area 202. The general flight-related data 204 that is displayed may include various types of data related to the flight plan of the aircraft. Such data includes, but is not limited to, the flight identifier, route iteration number, a waypoint list and associated information, such as bearing and time to arrive, just to name a few. It will be appreciated that the general flight-related data 204 may additionally include various types of data associated with various types of flight hazards.

The lateral situation display 206 provides a two-dimensional lateral situation view of the aircraft along the current flight path, and the vertical situation display 208 provides either a two-dimensional profile vertical situation view or a perspective vertical situation view of the aircraft along the current flight path and/or ahead of the aircraft. While not depicted in FIG. 2, the lateral situation display 206 and the vertical situation display 208 may each selectively display various features including, for example, a top-view symbol and a side-view aircraft symbol, respectively, in addition to various symbols representative of the current flight plan, various navigation aids, and various map features below and/or ahead of the current flight path such as, for example, terrain, runways, and political boundaries. It will be appreciated that the lateral situation display 206 and the vertical situation display 208 preferably use the same scale so that the pilot can easily orient the present aircraft position to either section of the display area 202. It will additionally be appreciated that the processor 104 may implement any one of numerous types of image rendering methods to process the data it receives from the navigation databases 106 and/or the navigation computer 108 and render the views displayed therein.

It was noted above that the flight-related data 204, the lateral situation display 206, and the vertical situation display 208 may be displayed either alone or in various combinations. Hence, before proceeding further with the description, it should be appreciated that, for clarity and ease of explanation and depiction, in each of the figures referenced below only the lateral situation display 206 and the vertical situation display 208, either alone or in combination, are shown being displayed in the display area 202 of the display device 112.

Figure 3:
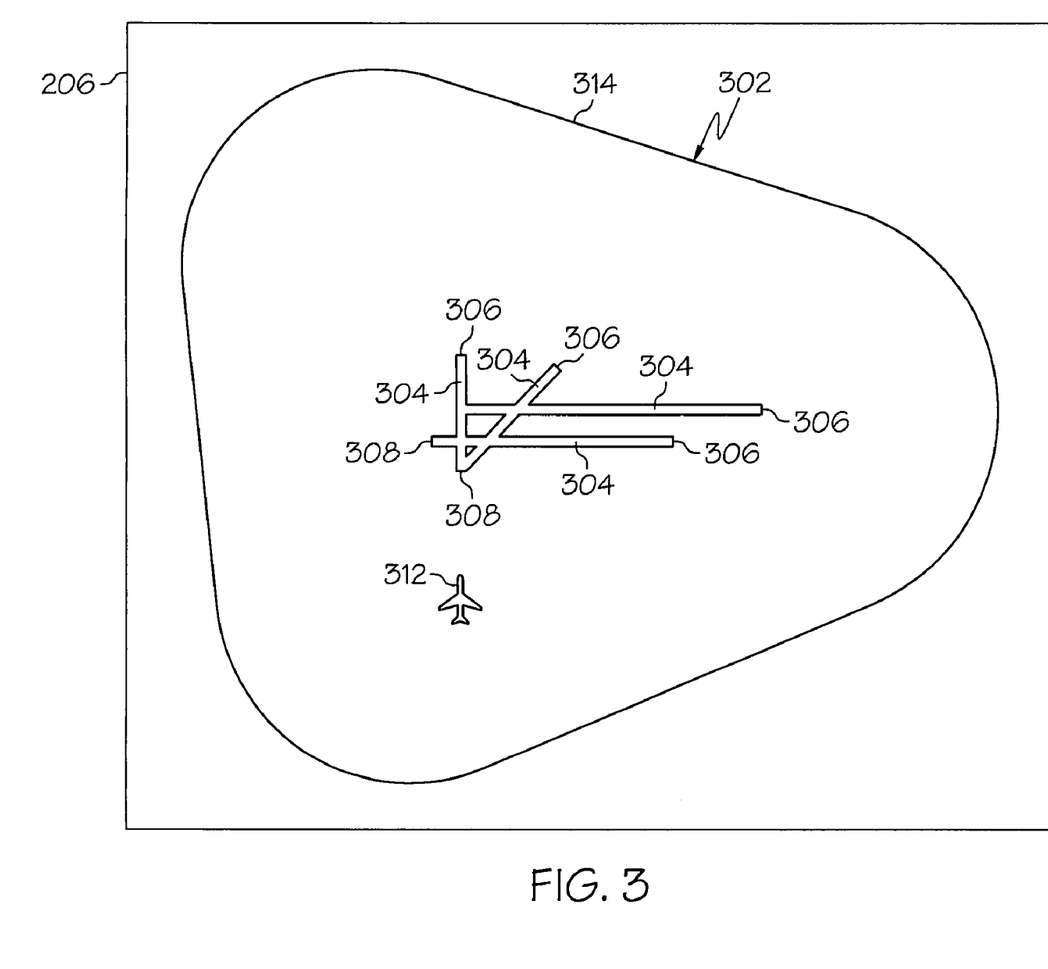
FIG. 3-8 are each exemplary display screens that depict a lateral situation view of protected airspace associated with a circle-to-land (CTL) maneuver and various other data.

Returning now to the description, as was previously noted, during a circle-to-land (CTL) maneuver the pilot 109 is responsible for keeping the aircraft within a defined protected air space. Thus, as is shown in FIG. 3, the processor 104 supplies display commands that cause the lateral situation display 206, in addition to or instead of one or more of the features mentioned above, to render a two-dimensional lateral situation view of the protected airspace 302 associated with the CTL maneuver being implemented. Because, as was also previously noted, the protected airspace 302 during the CTL maneuver is defined as a fixed radius arc from the ends 306, 308 of each airport runway, the processor 104 also preferably supplies display commands that cause the lateral situation display 206 to render the protected airspace 302 and each airport runway 304 simultaneously. Moreover, the processor 104 preferably supplies display commands that cause the lateral situation display 206 to render a top-view symbol 312 of the aircraft.

Figure 4:
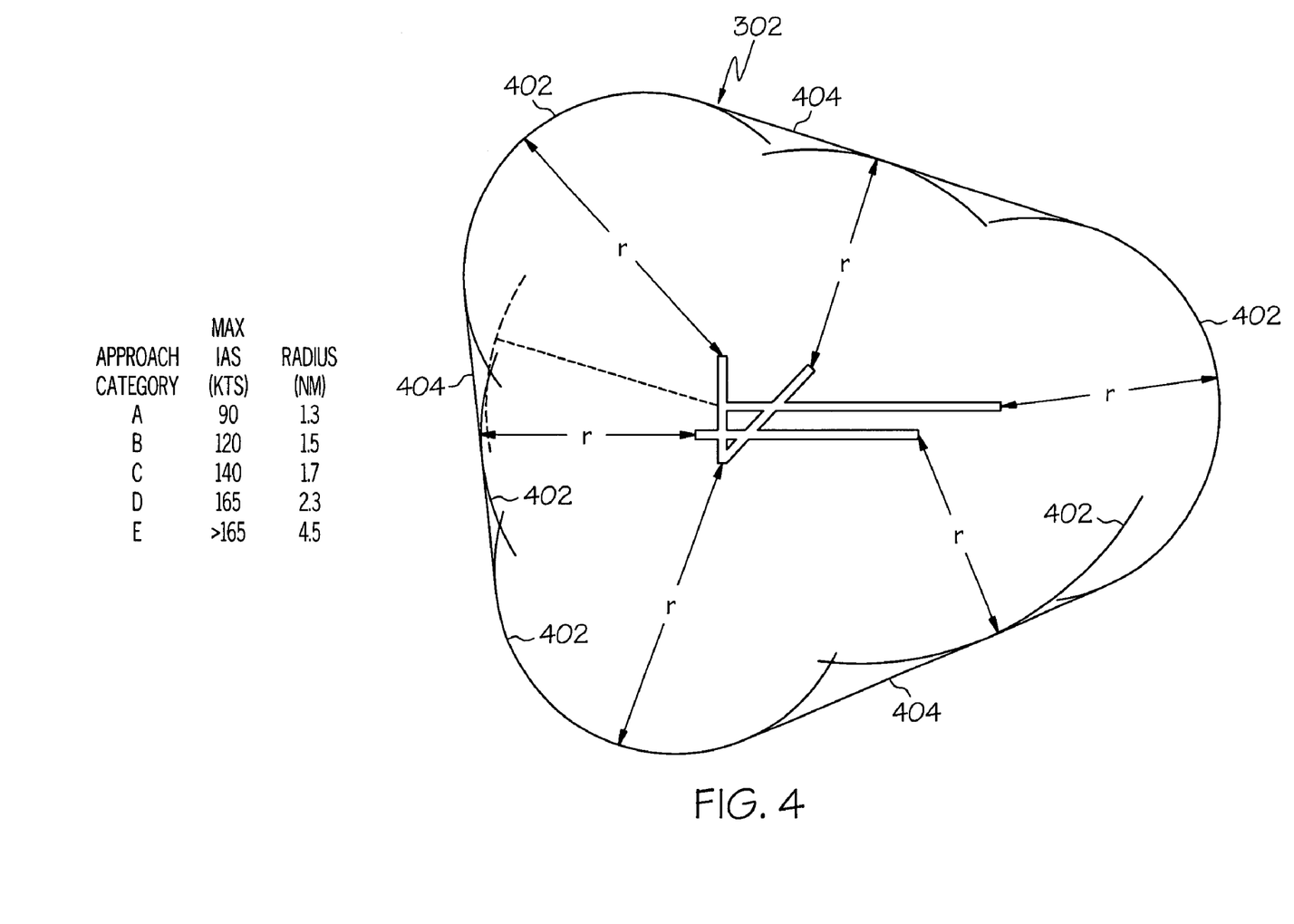

Although the protected airspace 302 could be rendered in the lateral situation display 206 in accordance with any one of numerous paradigms, as FIGS. 3 and 4 illustrate it is preferably rendered as a single, contiguous boundary line 314 using fixed-radii arc segments 402 and straight lines 404 that are tangent to predetermined points on each arc segment 402. The radius (r) of each arc segment 402 depends, as was also noted above, on the aircraft approach category during the CTL maneuver. Thus, as FIG. 4 also shows, the radius (r) of each arc segment 402 varies from about 1.3 nautical miles (NM) to about 4.5 NM, as aircraft approach category varies from Category A to Category E, which corresponds to a variation in indicated air speed (IAS) of about 90 knots (kts) to >165 kts. In order to implement this variation in arc segment radius (r), and thus overall area of the protected airspace 302, the processor 104 is supplied with data representative of aircraft approach category during the CTL maneuver. It will be appreciated that this data may be entered manually by the pilot 109, or supplied automatically from, for example, the navigation computer 108. It will additionally be appreciated that the specific data shown in FIG. 4 are those presently established by the Federal Aviation Administration (FAA), and that these numbers may be modified by the regulatory body in the future. Moreover, these data may vary for other regulatory jurisdictions or authorities. For example, category data established by the International Civil Aviation Organization (ICAO), while not depicted, differs from that shown in FIG. 4. The system 100 is configured to use the data associated with specific jurisdiction in which the aircraft is implementing the CTL maneuver.

Figure 5:
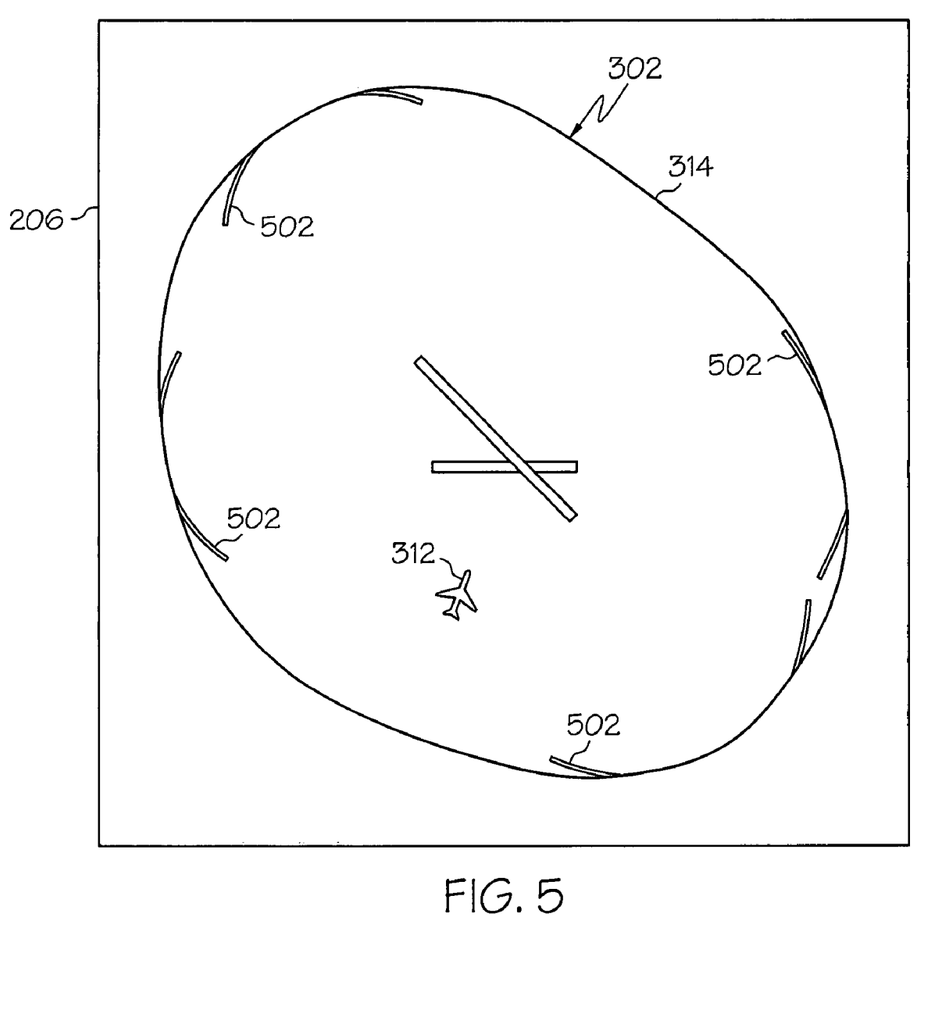
Figure 6:
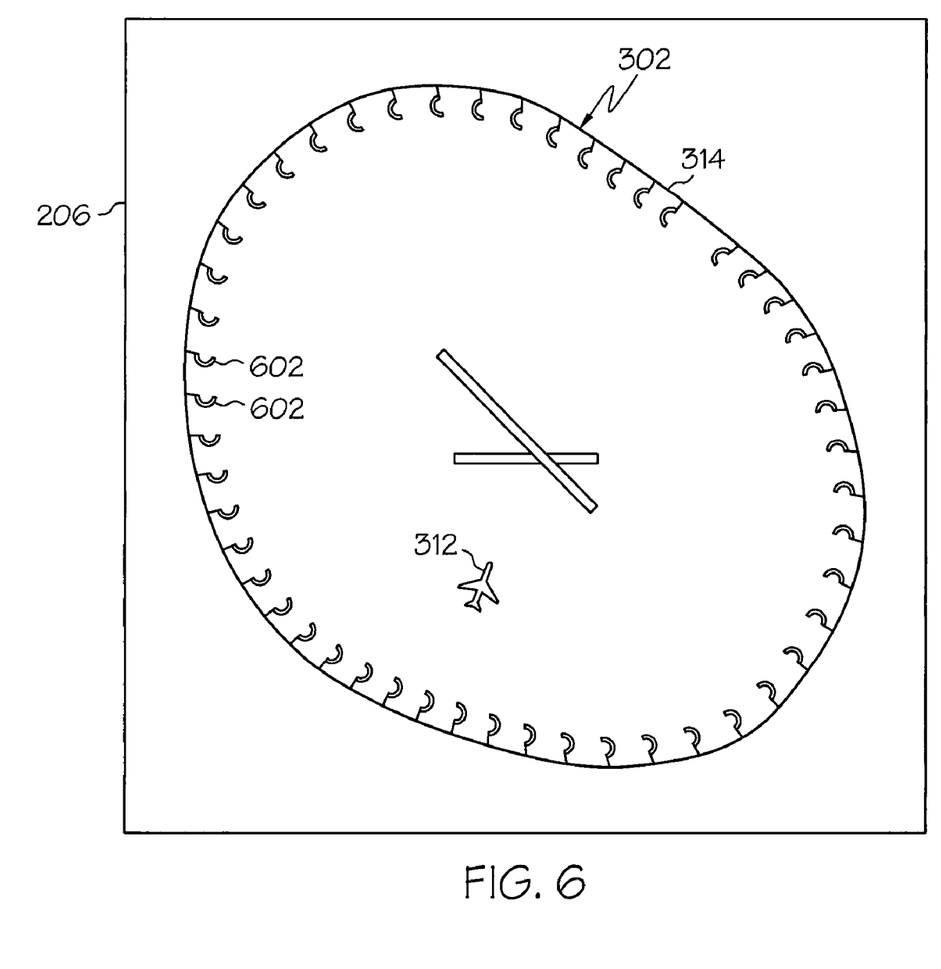
Figure 7:
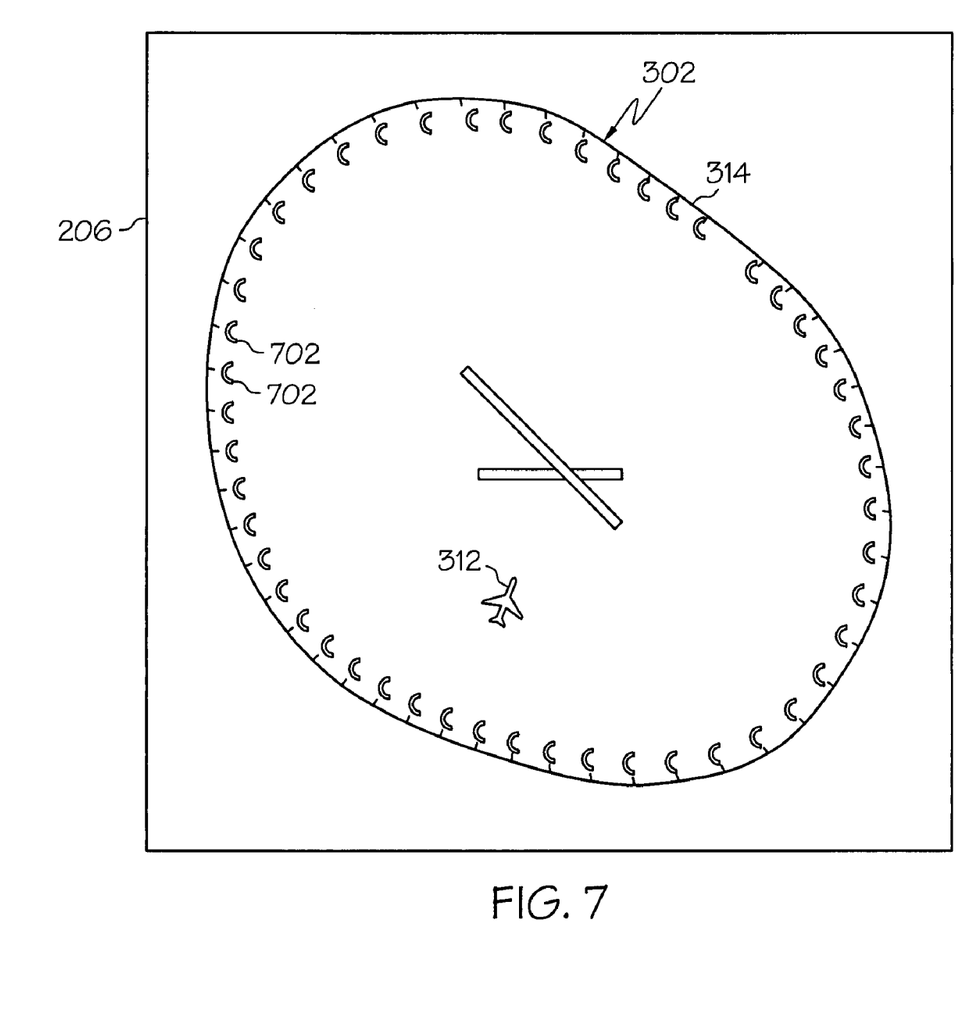

The manner in which the protected airspace 302 is rendered in the lateral situation display 206 is not limited to the single, contiguous boundary line 314 shown in FIGS. 3 and 4. Indeed, as is shown in FIG. 5, the protected airspace 302 could be rendered with one or more extended arc segments 502 superimposed onto the boundary line 314. It is noted that the extended arc segments 502 correspond to the fixed radius arc segments 402 shown in FIG. 4 that are defined from the ends 306, 308 of each airport runway 304. Alternatively, as shown in FIGS. 6 and 7, the protected airspace 302 could be rendered with a plurality of geometric symbols 602 that extend radially inwardly from the boundary line 314. In the depicted embodiments, the geometric symbols 602 are each rendered as a "non-rotated C" and a "rotated C," respectively. It will be appreciated, however, that these symbols 602 are merely exemplary, and that any one of numerous other symbols could be used.

In addition to causing the display device 112 to render an image of the protected airspace 302, the processor 104 is also preferably configured to supply image rendering commands that cause the display device 112 to render advisory indicia. More specifically, the processor 104 is preferably coupled to receive position data representative of current aircraft position. Although the position data may be supplied from any one of numerous sources, in the depicted embodiment, the position data is supplied from the navigation computer 108. No matter the specific source of the position data, if these data indicate that the aircraft is inside the protected airspace 302 and within a predetermined distance of the protected airspace boundary line 314, the processor 104 supplies the image rendering commands that cause the display device 112 to render the advisory indicia. It will be appreciated that this predetermined distance may vary.

The advisory indicia may additionally be rendered in response to various other parameters, not just distance. For example, the processor 104 may receive various other types of inertial data in addition to aircraft position data, which are then processed to determine if the aircraft will reach or cross the boundary line 314 (or the top or bottom) of the protected airspace 302 in a predetermined amount of time. Data such as closure rate, distance, turning, and altitude could be used to determine the amount of time to reach or cross the boundary line 314. No matter the specific data used, if the processor 104 determines that the aircraft will reach, or go outside of, the protected airspace 302 within the predetermined time period, the processor 104 supplies the image rendering commands that cause the display device 112 to render the advisory indicia.

As with the protected airspace 302, it will be appreciated that the advisory indicia may be rendered according to any one of numerous paradigms. For example, the color in which the boundary line 314 and/or extended arc segments 502 and/or geometric symbols 602 are rendered could change, in whole or in part, from one color to another. As a specific example, the boundary line 314 could be rendered in blue if the aircraft is outside of the protected airspace 302, or within the protected airspace 302 and not within the predetermined distance or predetermined time period; however, if the aircraft is within the protected airspace 302 and moves within the predetermined distance or will reach or cross the protected airspace 302 in the predetermined time period, the boundary line 314 is then rendered in red. In an alternative exemplary embodiment, some or all of the symbols 602, if included, could be rotated or caused to move, and in yet another embodiment, the advisory indicia is rendered as a separate symbol or set of symbols, such as text or other images.

Figure 1:
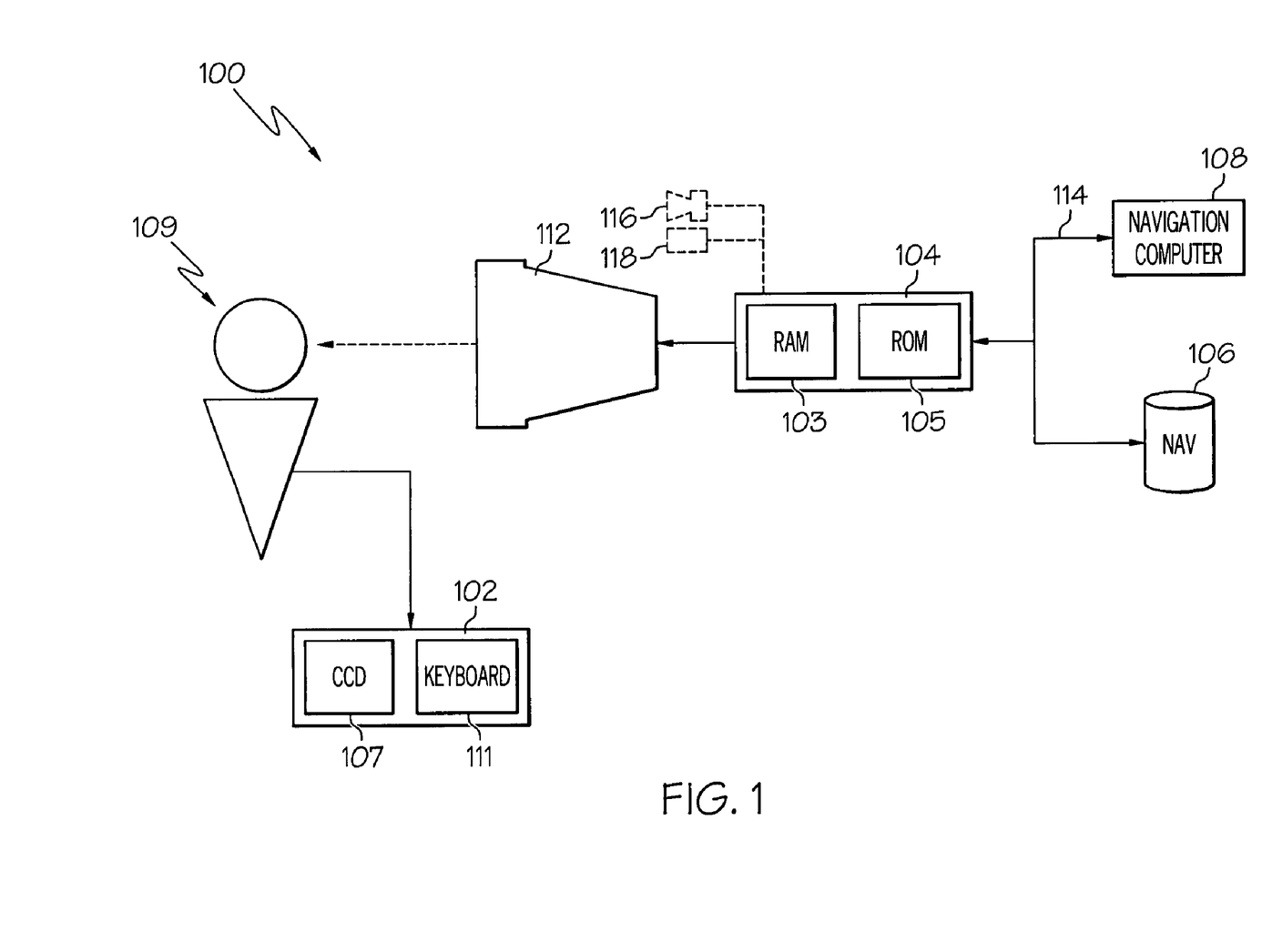
FIG. 1 is a functional block diagram of a flight deck display system according to one embodiment of the present invention.

It will additionally be appreciated that in still another alternative embodiment, which is shown in phantom in FIG. 1, the system 100 may be configured such that it does not render an image of the protected airspace 302, but instead only supplies visual and/or aural advisory indicia. For example, the system 100 could be configured to only generate an aural warning when the aircraft is within a predetermined distance of the protected airspace. Alternatively, the system 100 could generate the aural warning 116 along with a visual indicator 118, either on the display device 112 or a separate dedicated visual indicator. It will be appreciated that this aural warning could be implemented in anyone of numerous ways such as, for example, a buzzer, horn, alarm, or a voice indicator that states, for example, "Leaving protected airspace!" In the depicted embodiment, this aural indicator is generated by processor 104; however, it will be appreciated that it could additionally be generated by a processor in the navigation computer 108, or in the previously mentioned and non-illustrated TAWS, or in any one of numerous other external systems or devices.

Figure 8:
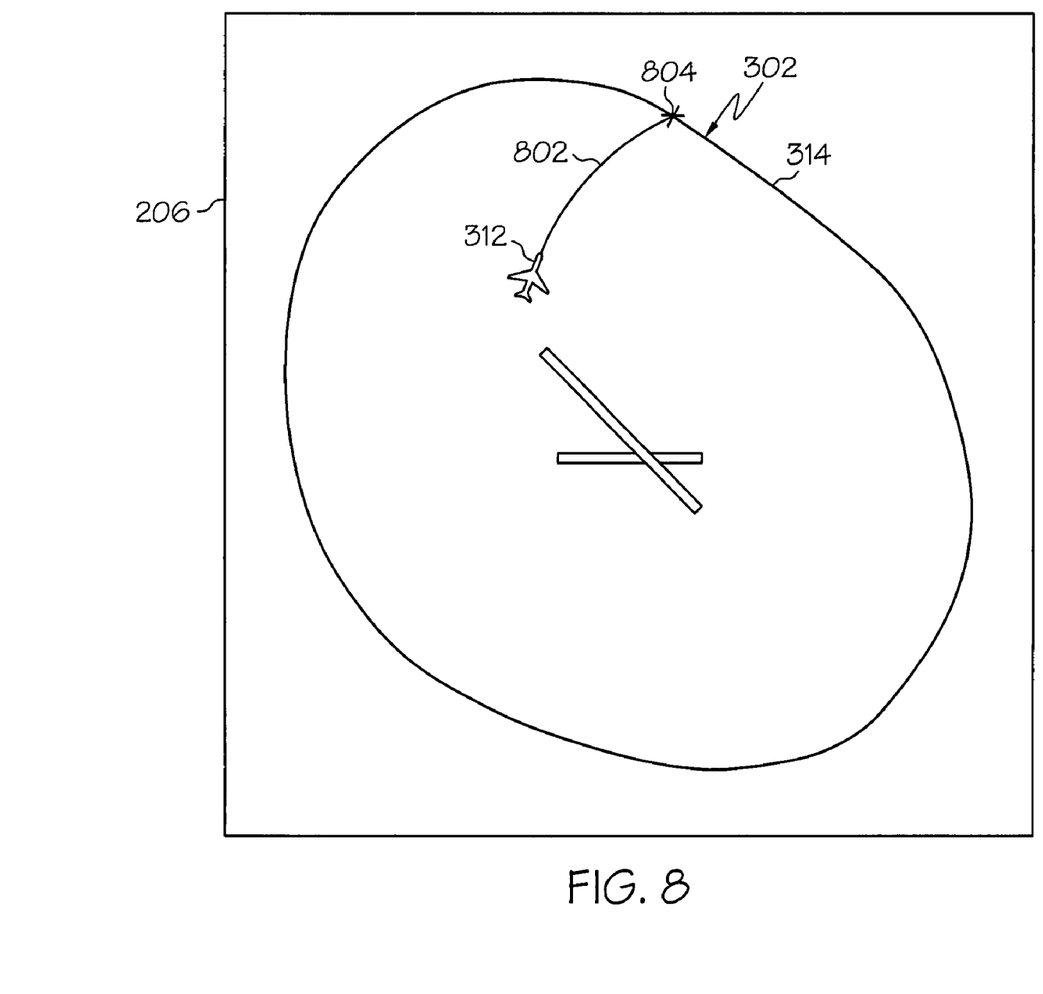

In addition to rendering the advisory indicia, the system 100 may also be configured to render an image of the expected track of the aircraft and the position at which the aircraft is expected to reach or cross the protected airspace 302. An exemplary embodiment that shows the expected aircraft track 802 and the position 804 at which it will cross reach the boundary of the protected airspace 302, based on the expected aircraft track 802, is shown in FIG. 8.

The system 100 is not limited to rendering the protected airspace 302 in the lateral situation display 206, and may be configured to render to the protected airspace 302 in the vertical situation display 208. If the system 100 is configured to render the protected airspace 302 in the vertical situation display 208, it will be appreciated that it could be rendered either simultaneously in both the lateral and vertical situation displays 206, 208 or only in the vertical situation display 208. It will additionally be appreciated that the protected airspace 302, when displayed in the vertical situation display 208, could be rendered therein as either a two-dimensional profile vertical situation view or a perspective vertical situation view.

Figure 9:
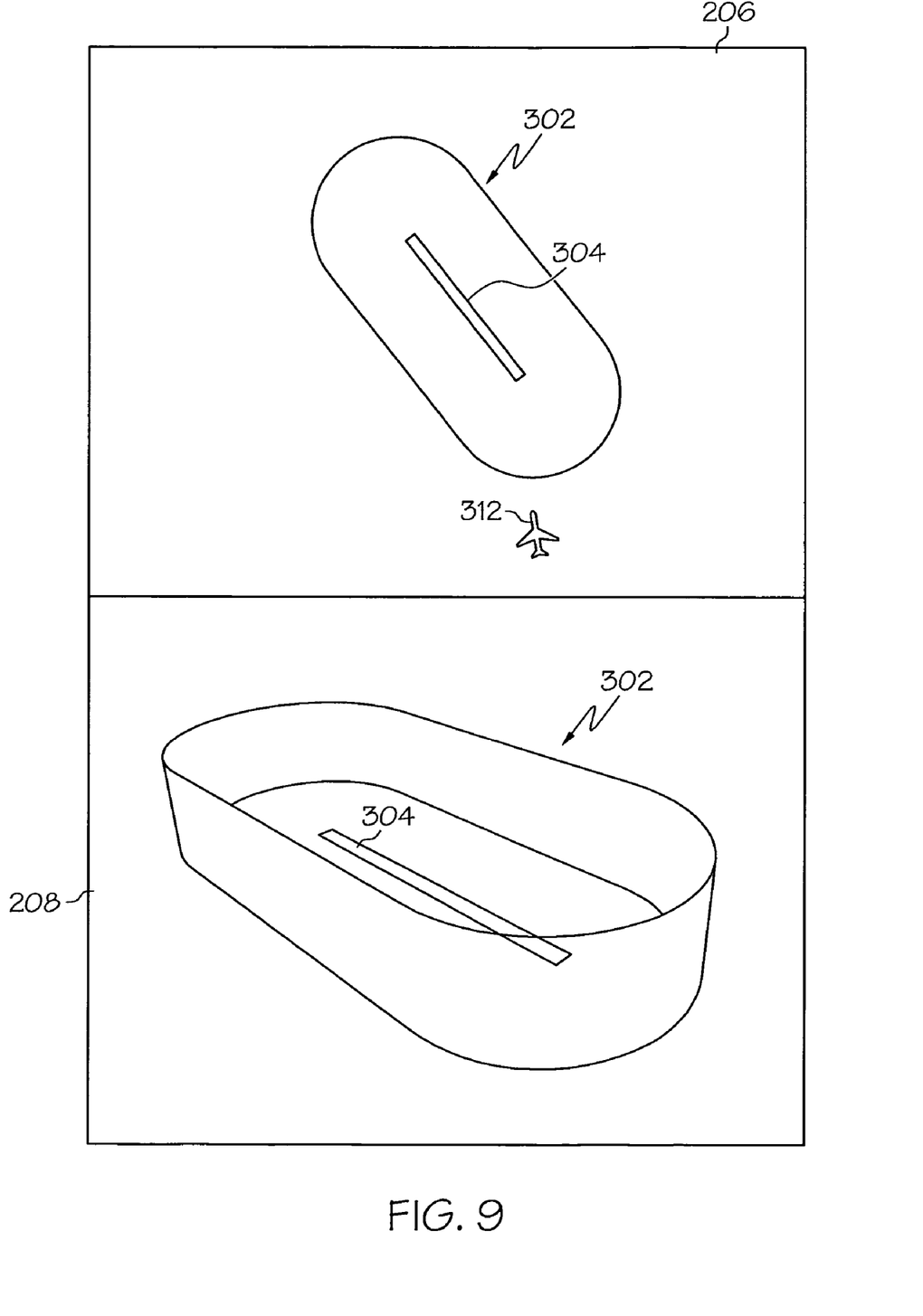
FIG. 9 is an exemplary display screen that depicts a perspective vertical situation view of protected airspace associated with a CTL maneuver in combination with a lateral situation view of the protected airspace.
Figure 10:
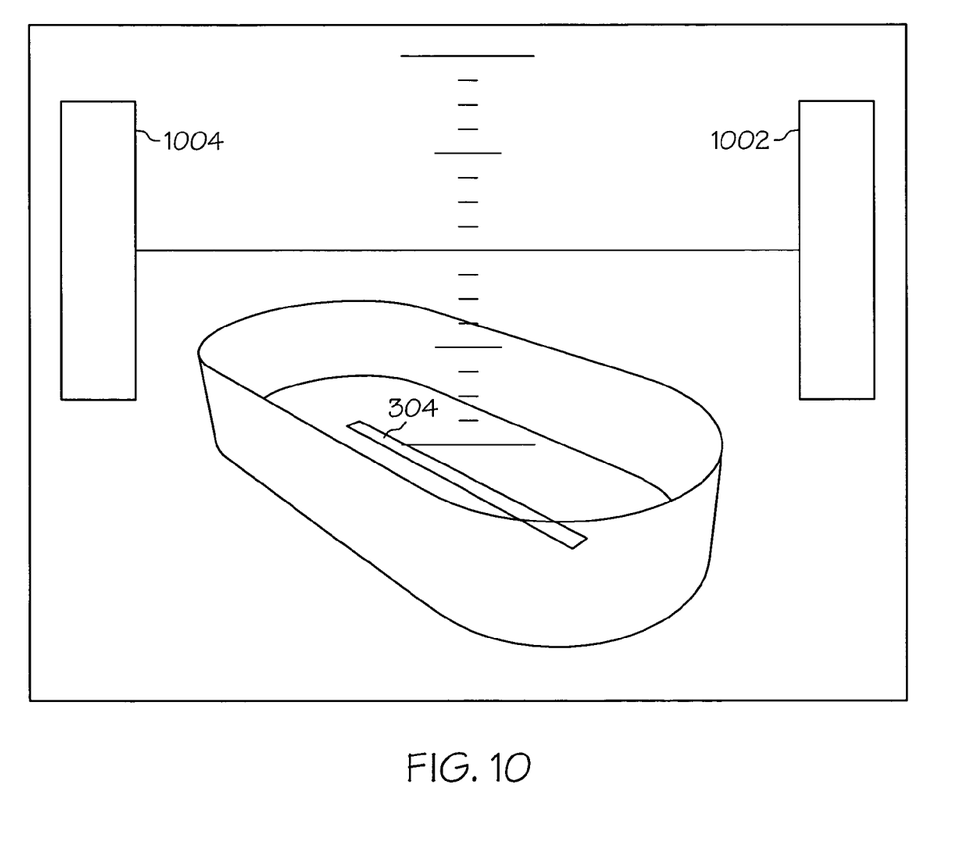
FIG. 10 is an exemplary display screen that depicts a perspective view of protected airspace associated with a CTL maneuver on a primary flight display (PFD).

An example of the protected airspace 302 being rendered as a perspective vertical situation view is illustrated in FIG. 9, and is shown displayed simultaneously with the lateral situation display 206. In the vertical situation display 208, a perspective "out-the-window" view of the airport runways 304 (only one shown n FIG. 8) and the protected airspace 302 are each rendered, whereas these features are rendered as two-dimensional lateral images in the lateral situation display 206. It will be appreciated that the view shown in FIG. 9 represents the view that is rendered on the display device 112 when the aircraft is outside the protected airspace 302. As is shown therein, the protected airspace 302 is preferably rendered as a n envelope around the air port runways 304 with a transparent bottom, top, and sides. When the aircraft moves within the protected airspace 302, the protected airspace 302 is rendered in the vertical situation display 208 as, for example, a substantially transparent wall or curtain that surrounds the aircraft. It will be appreciated that if the protected airspace 302 is rendered as a perspective vertical situation view, it may be rendered to include the extended arc segments 502 and/or symbols 602 and/or the advisory indicia associated with the lateral two-dimensional view of the protected airspace 302. It will additionally be appreciated that the system 100 is not limited to rendering the protected airspace 302 in the lateral and vertical situation displays 206, 208. Indeed, as shown in FIG. 10, the system 100 may also render the protected airspace 302 as a perspective view in a primary flight display (PFD). An exemplary embodiment of a PFD 1000 rendering the protected airspace 302 as a perspective view is shown in FIG. 10. When displayed in the PFD 1000, it will be appreciated that the protected airspace 302 is preferably rendered similar to that in the vertical situation display 208, as described above, along with other data that are typically rendered on the PFD 1000, such as altitude 1002, and airspeed 1004.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A flight deck display system for an aircraft, comprising:
a processor configured to receive data representative of an aircraft approach category at an airport and configured, in response thereto, to supply one or more protected airspace image rendering display commands; and
a display device coupled to receive the protected airspace image rendering display commands and configured, in response thereto, to render an image representative of overall area of a protected airspace associated with the aircraft approach category for the airport,
wherein the display device displays the overall area of the protected airspace as a geometric shape formed of a single, contiguous boundary line that includes arc segments and straight lines that are tangent to predetermined points on each arc segment, each arc segment having a fixed radius that depends on the aircraft approach category at the airport.

2. The system of claim 1, wherein:
the processor is further configured to receive data representative of one or more airport runways for the airport, and is further configured, in response thereto, to supply one or more runway image rendering display commands; and
the display device is further coupled to receive the runway image rendering display commands and is further configured, in response thereto, to simultaneously render an image of one or more runways representative of the runway data.

3. The system of claim 2, wherein the protected airspace and runways are each rendered as two-dimensional images.

4. The system of claim 2, wherein the protected airspace and runways are each rendered as perspective images.

5. The system of claim 1, wherein the display device, in response to the protected airspace image rendering display commands, further displays the overall area of the protected airspace with one or more extended arc segments superimposed onto the boundary line.

6. The system of claim 5, wherein:
the processor is further configured to receive data representative of one or more airport runways, and is further configured, in response thereto, supply one or more runway image rendering display commands;
the display device is further coupled to receive the runway image rendering display commands and is further configured, in response thereto, to simultaneously render an image of one or more runways representative of the runway data, each runway having at least a first and second end; and
the superimposed extended arc segments each represent a predetermined radius from the first and second ends of each of the displayed runways.

7. The system of claim 1, wherein the display device, in response to the protected airspace image rendering display commands, further renders the image of the overall area of the protected airspace with advisory indicia, the advisory indicia representative of a predetermined margin to the protected airspace boundary line.

8. The system of claim 7, wherein:
the processor is further configured to receive data representative of at least aircraft position, and is configured, in response thereto, to supply position-dependent protected airspace image rendering commands; and
the display device is coupled to receive the position-dependent protected airspace image rendering commands, and is further configured, in response thereto, to render the image of the overall area of the protected airspace with the advisory indicia when the determined aircraft position is (i) inside the protected airspace and (ii) within a predetermined distance from the protected airspace boundary line.

9. The system of claim 7, wherein the predetermined margin is a predetermined time period to reach the protected airspace boundary line.

10. The system of claim 9, wherein:
the processor is further configured to receive data representative of at least current aircraft track, and is configured, in response thereto, to supply aircraft track image rendering commands; and
the display device is coupled to receive the aircraft track image rendering commands, and is further configured, in response thereto, to render the image of the overall area of the protected airspace with the advisory indicia and the current aircraft track when the aircraft track (i) is inside the protected airspace and (ii) will result in reaching the protected airspace boundary line at least within the predetermined time period.

11. The system of claim 1, wherein:
the processor is further configured to receive data representative of at least aircraft position, and is further configured, in response thereto, to supply position-dependent protected airspace image rendering commands; and
the display device is coupled to receive the position-dependent protected airspace image rendering commands, and is further configured, in response thereto, to render the image of the protected airspace in either a first color or a second color.

12. The system of claim 11, wherein the image of the protected airspace is rendered in the second color when the when the aircraft position is (i) inside the protected airspace and (ii) within a predetermined distance from the protected airspace boundary line.

13. The system of claim 1, wherein:
the processor is further configured to receive data representative of at least aircraft position, and is further configured, in response thereto, to supply one or more aircraft position rendering display commands; and
the display device is further coupled to receive the aircraft position rendering commands and is further configured, in response thereto, to simultaneously render an image of the aircraft position.

\* \* \* \* \*

UNITED STATES PATENT AND TRADEMARK OFFICE
CERTIFICATE OF CORRECTION

| | | |
|---|---|---|
| PATENT NO. | : 8,078,344 B2 | Page 1 of 1 |
| APPLICATION NO. | : 11/112796 | |
| DATED | : December 13, 2011 | |
| INVENTOR(S) | : Dwyer et al. | |

It is certified that error appears in the above-identified patent and that said Letters Patent is hereby corrected as shown below:

Column 10, line 37, delete "when the".

Signed and Sealed this

Nineteenth Day of June, 2012

David J. Kappos
*Director of the United States Patent and Trademark Office*